United States Patent
Matsuura

(10) Patent No.: US 6,952,503 B2
(45) Date of Patent: Oct. 4, 2005

(54) IMAGE PROCESSING APPARATUS AND METHOD

(75) Inventor: Takahiro Matsuura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 277 days.

(21) Appl. No.: 10/246,397

(22) Filed: Sep. 19, 2002

(65) Prior Publication Data

US 2003/0016881 A1 Jan. 23, 2003

Related U.S. Application Data

(62) Division of application No. 09/304,686, filed on May 4, 1999, now Pat. No. 6,493,468.

(30) Foreign Application Priority Data

| May 6, 1998 | (JP) | ............................................. 10-123054 |
| May 6, 1998 | (JP) | ............................................. 10-123684 |

(51) Int. Cl.$^7$ ................................................. G06K 9/40
(52) U.S. Cl. ........................ 382/274; 382/167; 382/169; 358/521
(58) Field of Search ................................. 358/461, 518, 358/521, 522, 448, 3.06, 3.21, 3.22; 382/162, 167, 168, 169, 274; 348/223, 655

(56) References Cited

U.S. PATENT DOCUMENTS

| 4,903,145 A | 2/1990 | Funada ........................ 358/462 |
| 4,956,703 A | 9/1990 | Uzeda et al. ................ 358/527 |
| 5,053,888 A | 10/1991 | Nomura ...................... 358/3.22 |
| 5,123,060 A | 6/1992 | Cho et al. .................... 382/274 |
| 5,410,418 A | 4/1995 | Yonezawa .................... 382/169 |
| 5,467,196 A | 11/1995 | Fukushima et al. ......... 358/298 |
| 5,680,477 A | 10/1997 | Asada .......................... 382/169 |
| 5,696,840 A | 12/1997 | Usami .......................... 382/167 |
| 5,703,644 A | * 12/1997 | Mori et al. ................... 348/363 |
| 5,748,773 A | 5/1998 | Tashiro et al. ............... 382/169 |
| 5,901,243 A | * 5/1999 | Beretta ......................... 382/168 |
| 5,926,562 A | * 7/1999 | Hyodo et al. ................ 382/167 |
| 6,018,589 A | 1/2000 | Hyodo .......................... 382/168 |
| 6,069,972 A | 5/2000 | Durg et al. ................... 382/167 |

* cited by examiner

Primary Examiner—Thomas D. Lee
(74) Attorney, Agent, or Firm—Fitzpatrick, Cella, Harper & Scinto

(57) ABSTRACT

It is difficult properly to perform correction processing such as white balance adjustment and exposure compensation for all types of images. This invention provides a way in which white balance adjustment and exposure compensation are performed in accordance with image features by considering the arrangements of pixel values in the highlighted and shadow areas of an image. Proper correction processing can therefore be performed for any types of images.

12 Claims, 22 Drawing Sheets

FIG. 2

| ITEM | VALUE |
|---|---|
| HIGHLIGHT POINT (LH) OF IMAGE | # # # |
| WHITE BALANCE OF RED (RH) | # # # |
| WHITE BALANCE OF GREEN (GH) | # # # |
| WHITE BALANCE OF BLUE (BH) | # # # |
| HIGHLIGHT POINT (HP) AFTER CORRECTION | # # # |
| HIGHLIGHT AREA | # #% ~ # #% |
| SHADOW POINT (LS) OF IMAGE | # # # |
| BLACK BALANCE OF RED (RS) | # # # |
| BLACK BALANCE OF GREEN (GS) | # # # |
| BLACK BALANCE OF BLUE (BS) | # # # |
| SHADOW POINT (SP) AFTER CORRECTION | # # # |
| SHADOW AREA | # #% ~ # #% |

F I G. 10

| ITEM | VALUE |
|---|---|
| HIGHLIGHT POINT (LH) OF IMAGE | # # # |
| WHITE BALANCE OF RED (RH) | # # # |
| WHITE BALANCE OF GREEN (GH) | # # # |
| WHITE BALANCE OF BLUE (BH) | # # # |
| HIGHLIGHT POINT (HP) AFTER CORRECTION | # # # |
| HIGHLIGHT AREA | # #% ~ # #% |
| SHADOW POINT (LS) OF IMAGE | # # # |
| BLACK BALANCE OF RED (RS) | # # # |
| BLACK BALANCE OF GREEN (GS) | # # # |
| BLACK BALANCE OF BLUE (BS) | # # # |
| SHADOW POINT (SP) AFTER CORRECTION | # # # |
| SHADOW AREA | # #% ~ # #% |
| AVERAGE LUMINANCE (AVE) OF IMAGE BEFORE CORRECTION | # # # |
| AVERAGE LUMINANCE (NAVE) OF IMAGE AFTER CORRECTION | # # # |

IMAGE PROCESSING APPARATUS AND METHOD

CROSS REFERENCE TO RELATED APPLICATION

This application is a division of application Ser. No. 09/304,686, filed May 4, 1999, now U.S. Pat. No. 6,493,468.

BACKGROUND OF THE INVENTION

1. Field of the Invention

This invention relates to an image processing apparatus and method and, more particularly, to an image processing apparatus and method which performs correction processing such as exposure compensation and white balance adjustment for digital images.

2. Description of the Related Art

Various types of image processing apparatuses having the functions of performing various processes and correction processing in forming multivalued digital images have been proposed and put into practice.

For example, some of these apparatuses are designed to perform exposure compensation for images. Exposure compensation in a conventional image processing apparatus is implemented by adjusting the luminance of an original image by increasing/decreasing the overall luminance.

In addition, some of the above image processing apparatus perform so-called white balance adjustment to obtain an image with high contrast by adjusting the luminance of a highlight portion which is the brightest portion of an image or a shadow portion which is the darkest portion. In white balance adjustment in the conventional image processing apparatus, the average luminances of R, G, and B pixels, except for pixels having luminances higher than a predetermined threshold, in a predetermined high-luminance area corresponding to a high-luminance range several % from the maximum luminance of an image are calculated, and the respective pixels are corrected on the basis of the average luminances.

In the above image correcting apparatus, exposure compensation does not take contrast information such as the highlight or shadow point of the image into consideration. For this reason, the exposure state of the original image cannot be properly checked, and proper exposure compensation cannot always be performed.

Likewise, white balance adjustment in the conventional image processing apparatus does not take image features such as the scene features presented by a target image into consideration. For this reason, if, for example, all the pixels in a high-luminance area of the image have luminances equal to or higher than a predetermined threshold, since there are no pixels from which average luminances are calculated, white balance adjustment cannot be performed.

For example, a photographic image including a fluorescent lamp in a room as an object image has a so-called blue cast, i.e., the tone of the picture darkens in portions other than the fluorescent lamp. Even if white balance adjustment is performed for such a photographic image, since all the pixels corresponding to the fluorescent lamp have luminances equal to or higher than the predetermined threshold, effective adjustment cannot be performed. Hence, the blue cast cannot be corrected.

In addition, when white balance adjustment is uniformly performed for any scenes, some scene may deteriorate in image quality. If, for example, strong white balance adjustment is performed for a "sunset" scene or "flower garden" scene, the scene is bleached out, and the "sunset" scene may not look like a sunset.

SUMMARY OF THE INVENTION

Accordingly, it is an object of the present invention to provide an image processing apparatus and method which can perform proper white balance adjustment for any images.

According to the present invention, the foregoing object is attained by providing an image processing apparatus comprising an image processing apparatus comprising extraction means for extracting a highlight area on the basis of a color distribution of an input image; calculation means for calculating white balance of the input image on the basis of pixels having luminances less than a predetermined highlight point in the highlight area; and setting means for setting a gradation correction condition on the basis of the white balance and the highlight point.

With this arrangement, proper white balance adjustment can be performed in accordance with image features.

And it is another object of the present invention to provide an image processing apparatus and method which can perform proper exposure compensation for any images.

According to the present invention, the foregoing object is attained by providing an image processing apparatus comprising an image processing apparatus comprising; extraction means for extracting highlight and shadow areas on the basis of a color distribution of an input image; calculation means for calculating an average luminance on the basis of the color distribution of the input image and calculating a target luminance on the basis of the average luminance and the highlight and shadow areas; and setting means for setting an exposure compensation condition on the basis of the target luminance.

With this arrangement, proper exposure compensation can be performed in accordance with image features.

And it is another object of the present invention to provide an image processing apparatus and method which perform proper white balance adjustment in accordance with the scene presented by an image.

According to the present invention, the foregoing object is attained by providing an image processing apparatus comprising an image processing apparatus comprising: extraction means for extracting a highlight area on the basis of a color distribution of an input image; calculation means for calculating white balance of the input image on the basis of pixels having luminances less than a predetermined highlight point in the highlight area; highlight correction means for correcting the highlight point in accordance with a first image feature; white balance correction means for correcting the white balance in accordance with a second image feature; and setting means for setting a gradation correction condition on the basis of the corrected highlight point and white balance.

With this arrangement, proper white balance adjustment can be performed in accordance with the scene presented by an image.

The invention is particularly advantageous since white balance adjustment and exposure compensation can be performed in accordance with image features by considering the arrangements of pixel values in the highlight and shadow areas of an image, and proper correction processing can be performed for any images.

Other features and advantages of the present invention will be apparent from the following description taken in

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a view showing examples of data items held by a parameter holding unit in this embodiment;

FIG. 10 is a view showing examples of data items held by a parameter holding unit in the second embodiment;

DETAILED DESCRIPTION OF THE PREFERRED EMBODIMENTS

Preferred embodiments of the present invention will new be described in detail in accordance with the accompanying drawings.

<First Embodiment>

An image processing apparatus for performing appropriate white balance adjustment to images according to this embodiment will be described below.

[Arrangement of Processing Unit]

Figure 1:
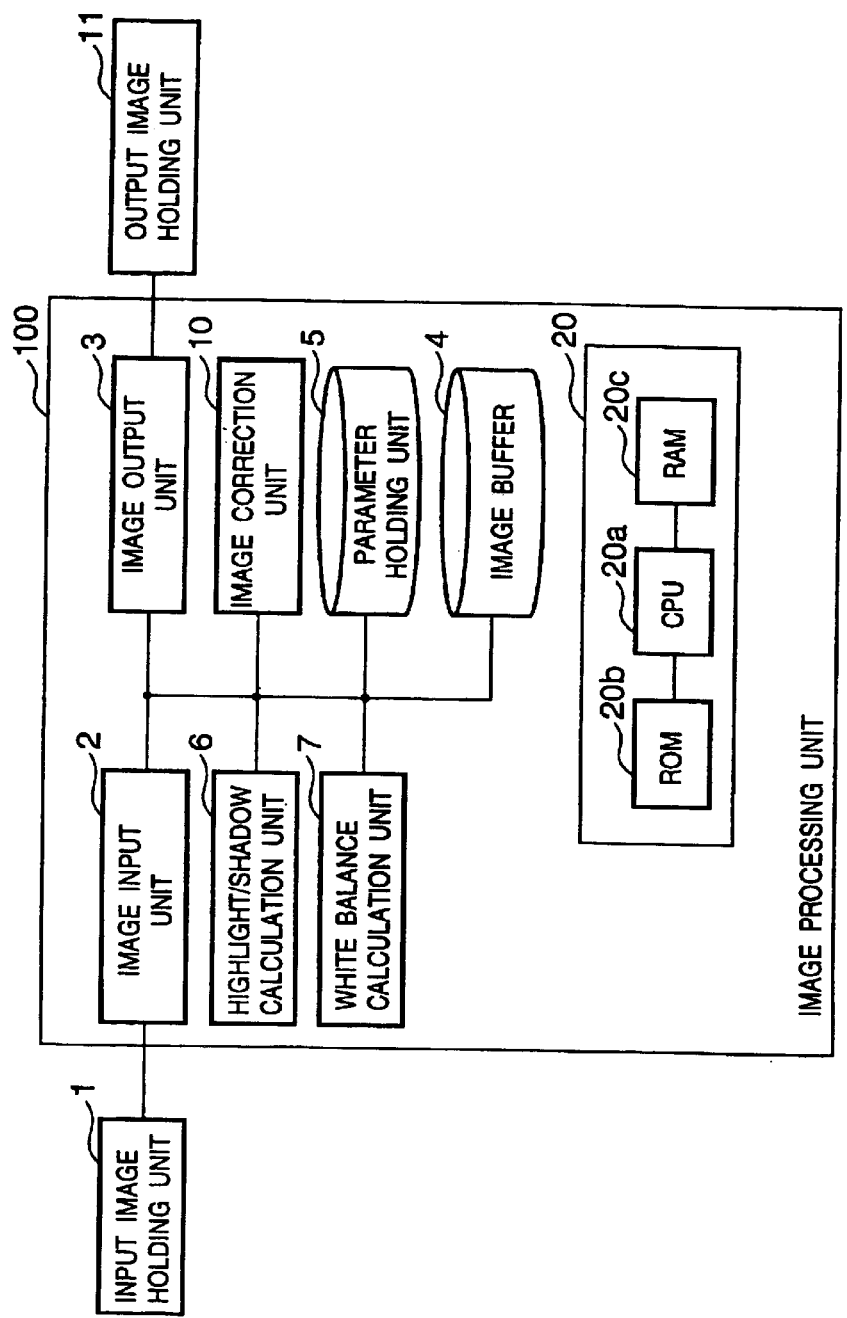
FIG. 1 is a block diagram showing an arrangement for white balance adjustment according to an embodiment of the present invention.

FIG. 1 is a block diagram showing the arrangement of an image processing unit for performing white balance adjustment in the image processing apparatus according to this embodiment. An image processing unit 100 of this embodiment is mainly comprised of an image input unit 2, an image output unit 3, an image buffer 4, a parameter holding unit 5, a highlight/shadow calculation unit 6, a white balance calculation unit 7, and an image correction unit 10.

Reference numeral 20 denotes a control unit constituted by a CPU 20a, a ROM 20b, a RAM 20c, and the like, and controls the operation and processing performed by each component (to be described later). The CPU 20a, in particular, executes control on multiplexing and associated processing (to be described later) by using the RAM 20c as a work memory in accordance with the programs stored in the ROM 20b in advance.

The image input unit 2 reads out image data from an input image holding unit 1 and writes it in the image buffer 4. The image buffer 4 holds image data before image correction, during correction, and after correction. The parameter holding unit 5 holds parameters required for image correction (to be described later). The highlight/shadow calculation unit 6 calculates highlight and shadow points of a correction target image, and stores the resultant data in the parameter holding unit 5. The white balance calculation unit 7 calculates the white and black balance data of the target image, and stores the resultant data in the parameter holding unit 5.

The image correction unit 10 performs white balance adjustment of the image data stored in the image buffer 4 on the basis of the data stored in the parameter holding unit 5. The image output unit 3 outputs the image data after exposure compensation, which is stored in the image buffer 4, by writing it in an output image holding unit 11.

The parameters held by the parameter holding unit 5 will be described below. FIG. 2 shows the data items held by the parameter holding unit 5. Referring to FIG. 2, the following data are held as parameters: the highlight and shadow points (LH and LS) of image data; the white and black balances (RH and RS) of red; the white and black balances (GH and GS) of green; the white and black balances (BH and BS) of blue; highlight and shadow points (HP and SP) after correction; and highlight and shadow areas.

In the initial state of this embodiment, these parameters are initialized into appropriate values. For example, "245" is set as the highlight point (HP) after correction, and "10" is set as the shadow point (SP) after correction. Assume that the highlight area is set to 99 to 100%, and the shadow area is set to 0 to 1%.

[White Balance Adjustment]

Figure 3:
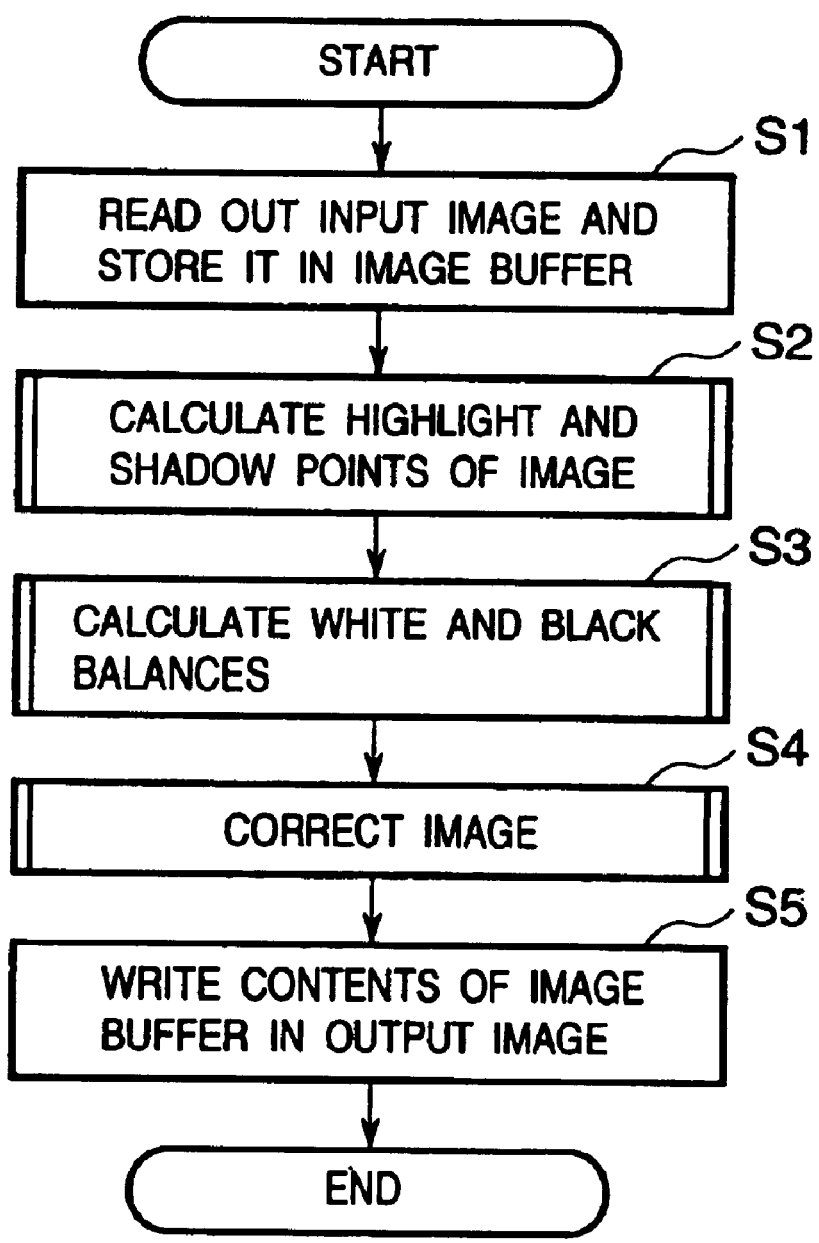
FIG. 3 is a flow chart showing an outline of white balance adjustment processing in this embodiment.

FIG. 3 is a flow chart showing an outline of a white balance adjustment method in this embodiment. First of all, in step S1, the image input unit 2 reads out image data from the input image holding unit 1 and stores it in the image buffer 4. In step S2, the highlight/shadow calculation unit 6 calculates the highlight and shadow points of the image data stored in the image buffer 4 and stores the resultant data in the parameter holding unit 5. This processing will be described in detail later with reference to FIG. 4.

In step S3, the white balance calculation unit 7 calculates the white balance data and black balance data of the image data stored in the image buffer 4. This processing will be described in detail later with reference to FIG. 6.

In step S4, the image correction unit 10 loads the image data from the image buffer 4, performs white balance adjustment in units of pixels, and writes the resultant data in the image buffer 4. This processing will be described in detail later with reference to FIG. 7.

In step S5, the image output unit 3 outputs the image data after exposure compensation, which is held by the image buffer 4, by writing it in the output image holding unit 11.

[Highlight/Shadow Calculation Processing]

Figure 4:
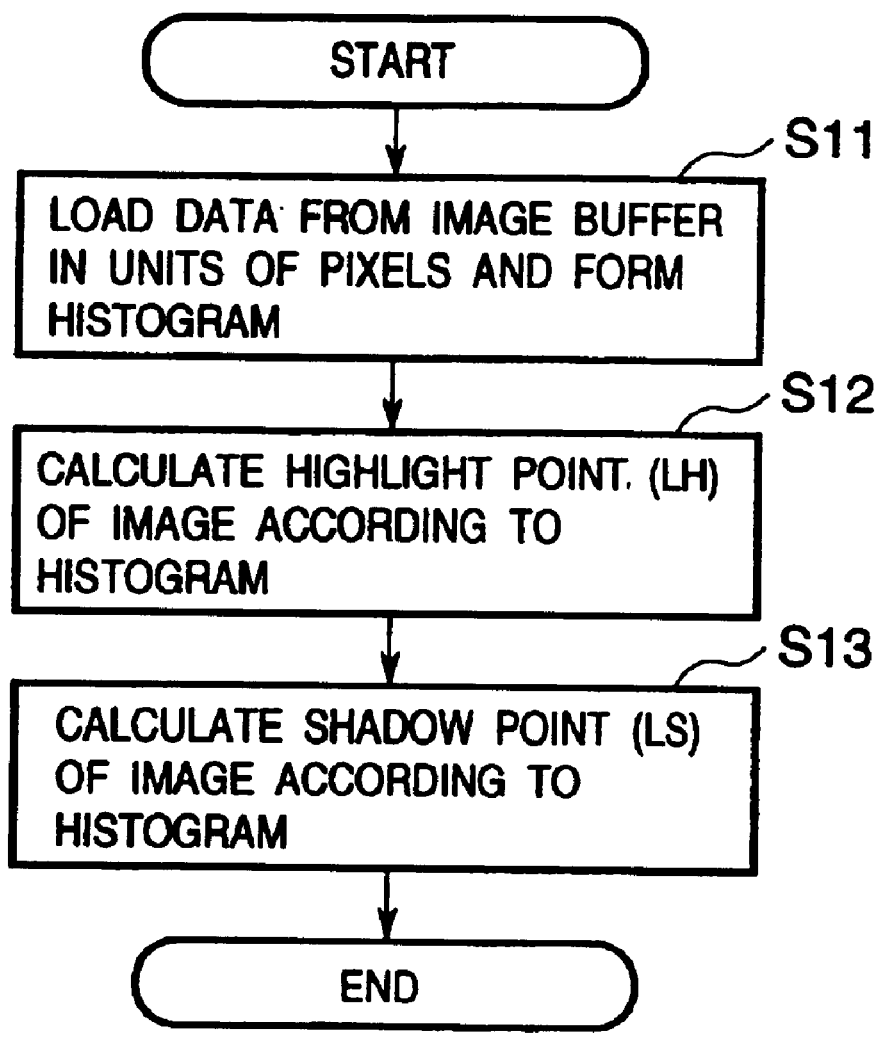
FIG. 4 is a flow chart showing highlight/shadow calculation processing in this embodiment.

FIG. 4 is a flow chart showing highlight/shadow calculation processing in the highlight/shadow calculation unit 6. This flow chart shows the details of step S2 in FIG. 3.

Figure 5:
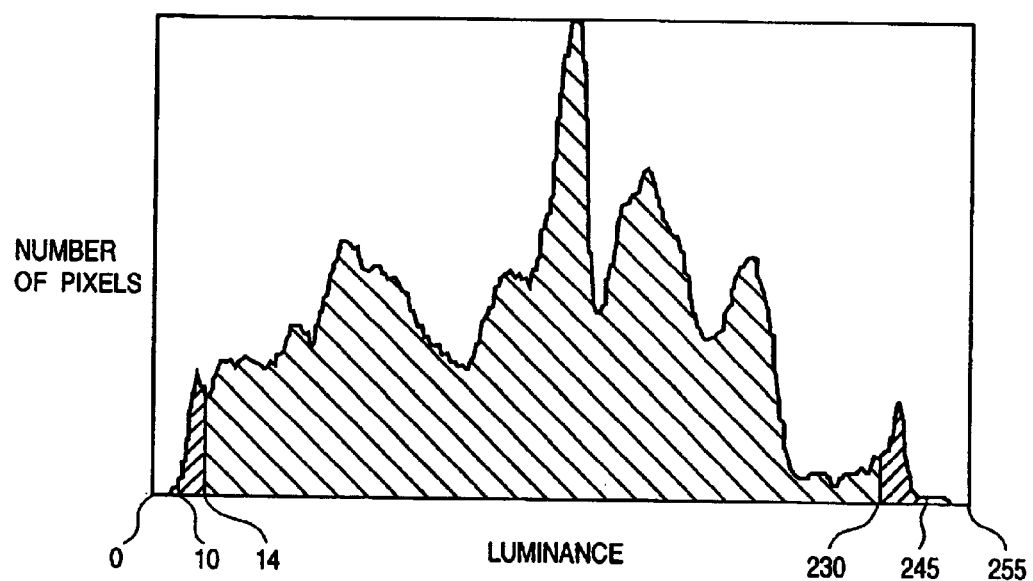
FIG. 5 is a graph showing an example of an image histogram in this embodiment.

First of all, in step S11, image data is loaded from the image buffer 4 in units of pixels, and a luminance histogram is formed. FIG. 5 shows an example of this luminance histogram.

In step S12, the highlight point (LH) of the image is calculated on the basis of the formed histogram. In this case, LH is the minimum luminance in the highlight area of the image. In the histogram shown in FIG. 5, since the luminance range corresponding to the highlight area "99 to 100%" is from 230 to 255, LH is "230". This result is stored in the parameter holding unit 5.

In step S13, the shadow point (LS) of the image is calculated on the basis of the formed histogram. In this case, LS is the maximum luminance in the shadow area of the image. In the histogram shown in FIG. 5, since the luminance range corresponding to the shadow area "0 to 1%" is from 0 to 14, LS is "14". This result is stored in the parameter holding unit 5.

[White/Black Balance Calculation Processing]

Figure 6:
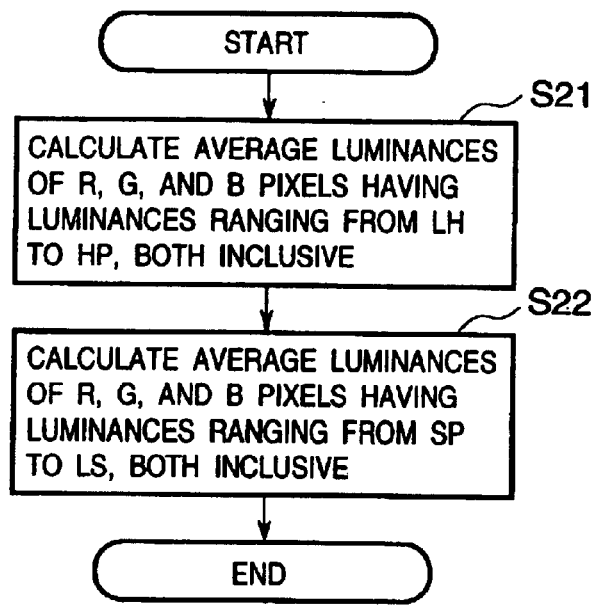
FIG. 6 is a flow chart showing white balance calculation processing in this embodiment.

FIG. 6 is a flow chart showing a white/black balance calculation processing in the white balance calculation unit 7. This flow chart shows the details of step S3 in FIG. 3.

First of all, white balance is calculated in step S21. More specifically, image data is loaded from the image buffer 4 in units of pixels to calculate the average luminances of R, G, and B pixels in the area where the luminances range from the highlight point (LH) before correction to the highlight point (HP) after correction. In the histogram shown in FIG. 5, this calculation is performed with respect to the area where the luminances range from "230" to "245", both inclusive. The respective average values obtained in this manner are stored as the white balance data (RH, GH, and BH) of the respective colors in the parameter holding unit 5.

In step S22, black balance is calculated. More specifically, image data is loaded from the image buffer 4 in units of pixels to calculate the average luminances of R, G, and B pixels in the area wherein the luminances range from the shadow point (SP) before correction to the shadow point (LS) after correction. In the histogram shown in FIG. 5, this calculation is performed with respect to the area where the luminances range from "10" to "14", both inclusive. The respective average values obtained in this manner as stored as the black balance data (RS, GS, and BS) of the respective colors in the parameter holding unit 5.

[Image Correction (White Balance Adjustment) Processing]

Figure 7:
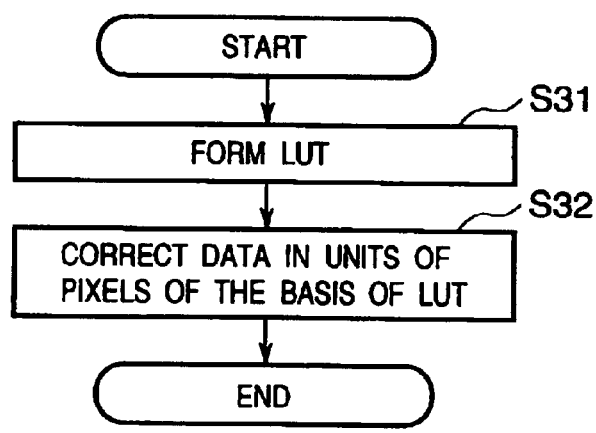
FIG. 7 is a flow chart showing image correction processing in this embodiment.

FIG. 7 is a flow chart showing image corresponding processing, i.e., exposure compensation processing, in the image correction unit 10. This flow chart shows the details of step S4 in FIG. 3.

Figure 8:
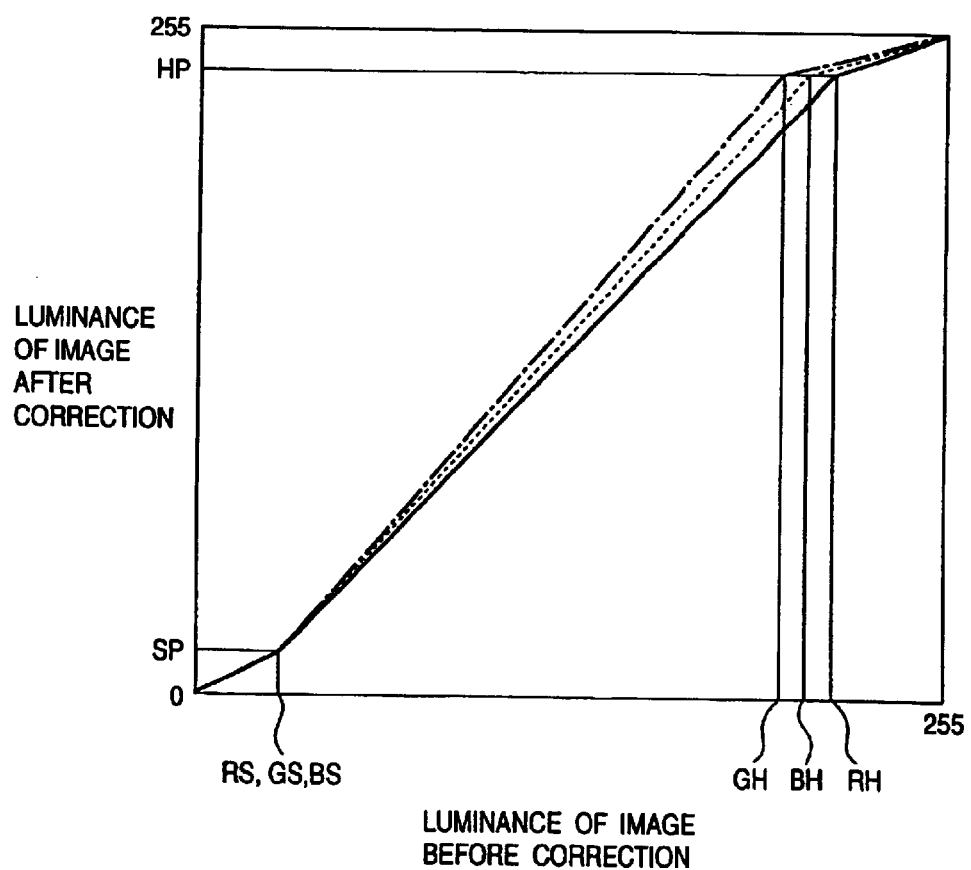
FIG. 8 is a graph showing an example of LUT formed in this embodiment.

First of all, in step S31, a lookup table (LUT) for color balance correction is formed on the basis of the white balance data (RH, GH, and BH) of the respective colors, black balance data (RS, GS, and BS), and highlight and shadow points (HP and SP) held in the parameter holding unit 5. FIG. 8 shows this LUT.

The LUT shown in FIG. 8 exhibits the characteristics represented by the curves plotted in units of colors by connecting the minimum luminance point ("0"), the points at which the shadow points (RS, GS, and BS) before correction are converted into the shadow point (SP) after correction, the points at which the highlight points (RH, GH, and BH) before correction are converted into the highlight point (HP) after correction, and the maximum luminance point ("255"). According to FIG. 8, the gamma values of the G, B, and R highlights increase in the order named. By enhancing G and B relative to R in this manner, for example, bluish fog on the image can be corrected.

In step S32, the image data stored in the image buffer 4 is corrected in units of pixels by using the formed LUT.

As described above, according to this embodiment, white balance adjustment is performed without giving any consideration to the highlight area where the luminances are equal to or more than a predetermined value and the shadow area where the luminances are equal to or less than a predetermined value. This prevents, for example, an unnatural high-luminance portion of an input image in which color cannot be visually recognized from being inappropriately set as a highlight point with the use of a simple arrangement.

With respect to, for example, even an image obtained by photography under a fluorescent lamp, appropriate white balance adjustment can be performed to correct its bluish fogging.

<Second Embodiment>

The second embodiment of the present invention will be described below. In the second embodiment, an image processing apparatus designed to perform appropriate exposure compensation in addition to white balance adjustment in the first embodiment will be described.

[Arrangement of Processing Unit]

Figure 9:
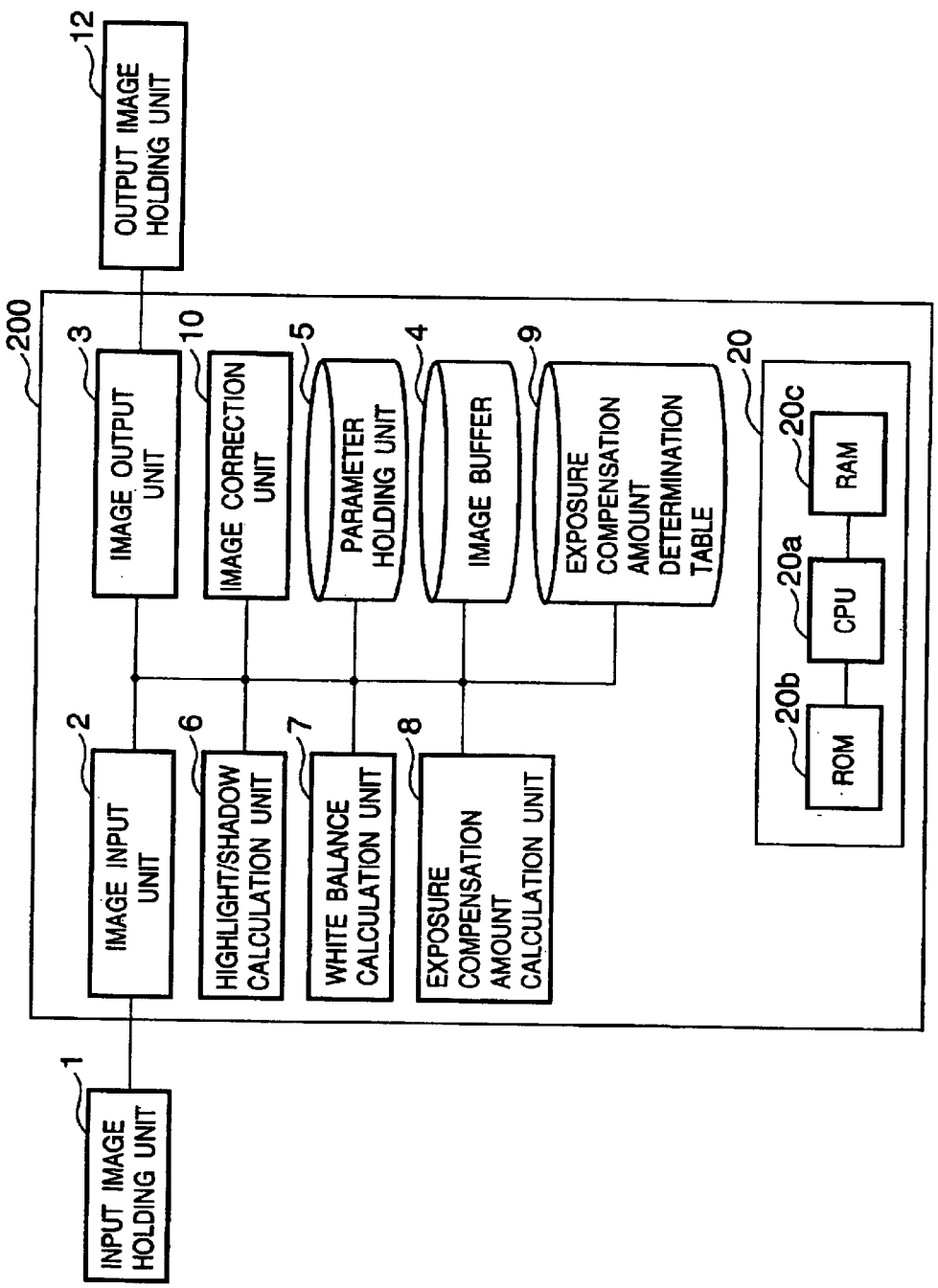
FIG. 9 is a block diagram showing an arrangement for exposure compensation according to the second embodiment of the present invention.

FIG. 9 is a block diagram showing the arrangement of an image processing unit for performing exposure compensation in the image processing apparatus of the second embodiment. The same reference numerals in a image processing unit 200 in the second embodiment denote the same parts as in the image processing unit 100 in the first embodiment, and a description thereof will be omitted.

Referring to FIG. 9, the image processing unit 200 is characterized by further including an exposure compensation amount calculation unit 8 and an exposure compensation amount determination table 9. The exposure compensation amount calculation unit 8 calculates the average luminance of a correction target image, and calculates the exposure compensation amount by referring to the exposure compensation amount determination table 9 on the basis of the average luminance. The exposure compensation amount determination table 9 holds average luminances before and after correction to determine an appropriate exposure compensation amount corresponding to the exposure state of the target image.

FIG. 10 shows the parameter items held by a parameter holding unit 5 in the second embodiment. The parameter holding unit 5 is characterized by holding average luminances (AVE and NAVE) before and after correction, unlike in the first embodiment.

[Exposure Compensation Method]

Figure 11:
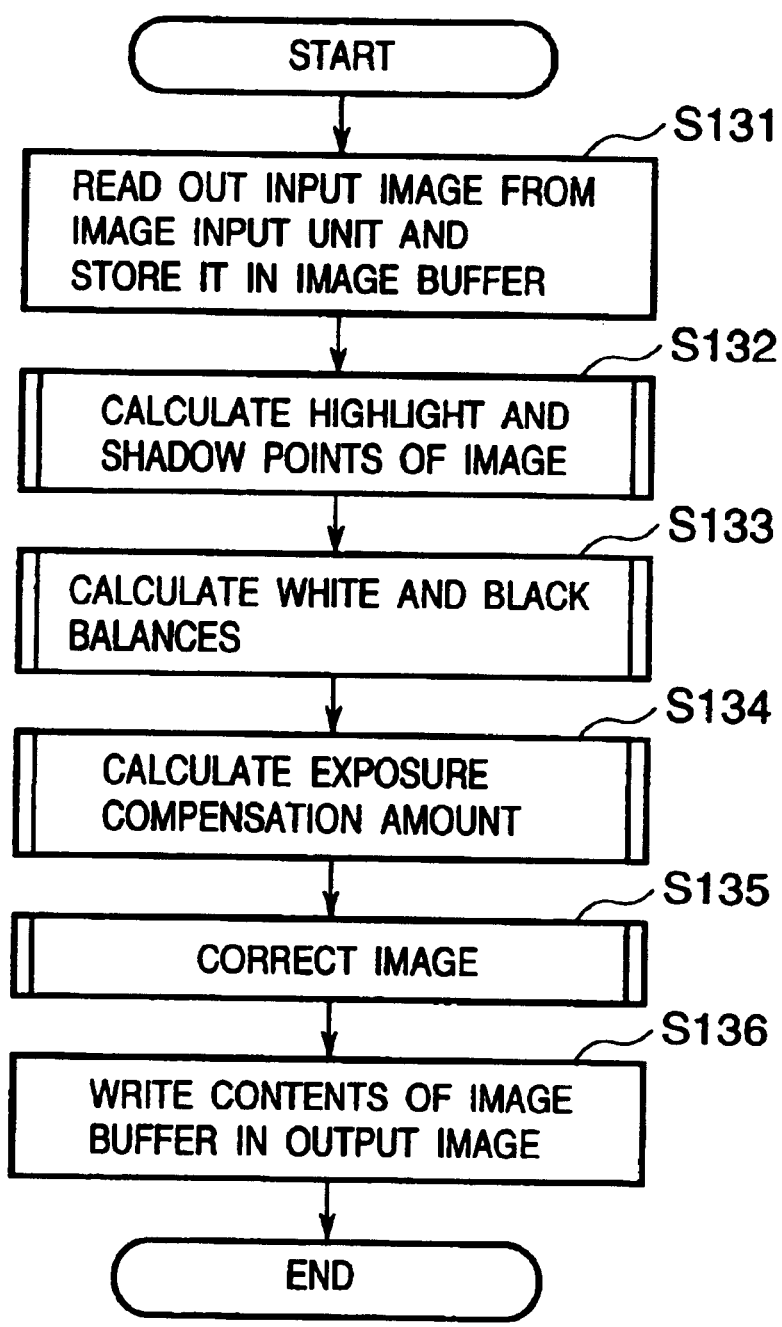
FIG. 11 is a flow chart showing an outline of exposure compensation processing in the second embodiment.

FIG. 11 is a flow chart showing an outline of an exposure compensation method according to the second embodiment. First of all, in step S131, an image input unit 2 reads out image data from an input image holding unit 1 and stores it in an image buffer 4. In step S132, a highlight/shadow calculation unit 6 calculates the highlight and shadow points of the image data stored in the image buffer 4, and stores them in the parameter holding unit 5. Since this processing is the same as step S2 in FIG. 3 in the first embodiment (shown in FIG. 4 in detail), a detailed description will be omitted.

In step S133, a white balance calculation unit 7 calculates the white balance data and black balance data of the image data stored in the image buffer 4. Since this processing is the same as step S3 in FIG. 3 in the first embodiment (shown in FIG. 6 in detail), a detailed description thereof will be omitted.

In step S134, the exposure compensation amount calculation unit 8 calculates an exposure compensation amount and stores the resultant data in the parameter holding unit 5. This processing will be described in detail later with reference to FIG. 12.

In step S135, an image correction unit 10 loads image data from the image buffer 4, performs exposure compensation in units of pixels, and writes the resultant data in the image buffer 4. This processing will be described in detail later with reference to FIG. 14.

In step S136, an image output unit 3 outputs the image data after exposure compensation, which is held by the image buffer 4, by writing it in the output image holding unit 11.

[Exposure Compensation Amount Calculation Processing]

Figure 12:
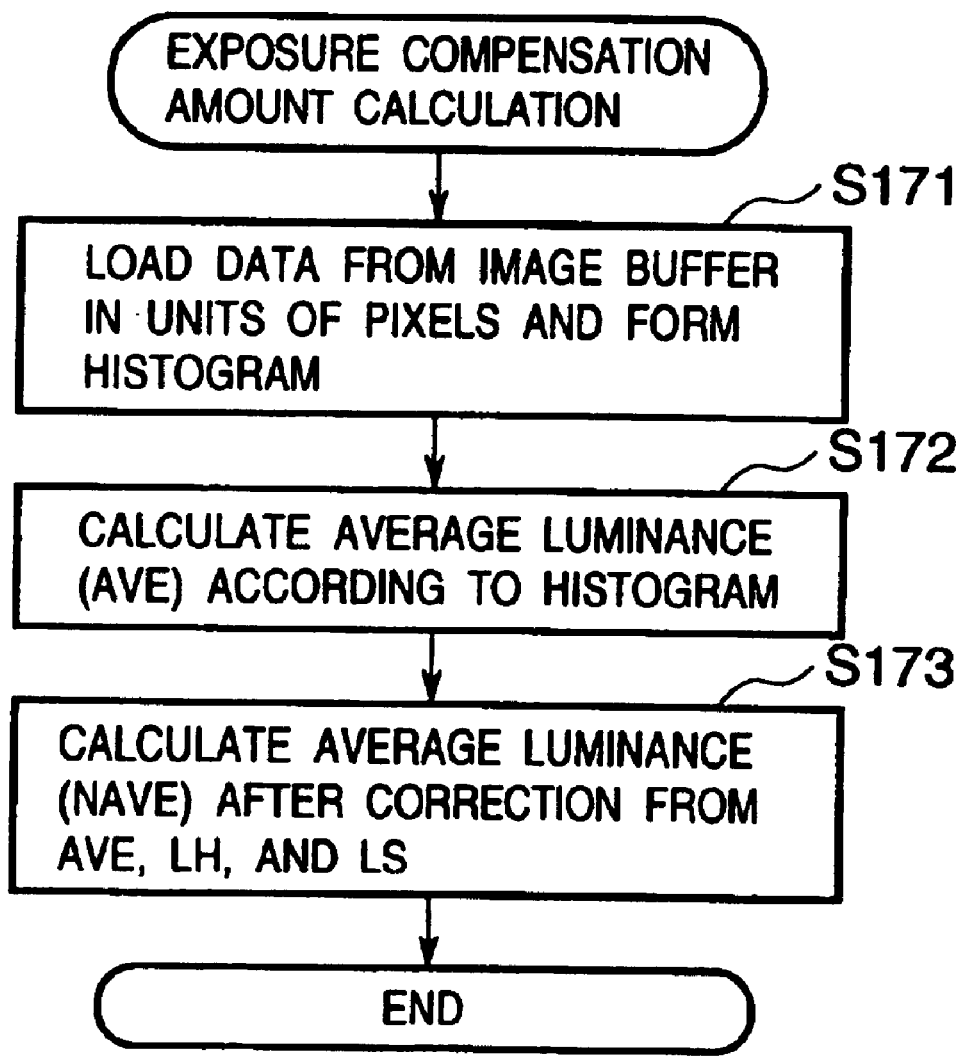
FIG. 12 is a flow chart showing exposure compensation amount calculation processing in the second embodiment.

FIG. 12 is a flow chart showing exposure compensation amount calculation processing in the exposure compensation amount calculation unit 8. This flow chart shows the details of step S134 in FIG. 11.

First of all, in step S171, image data is loaded from the image buffer 4 in units of pixels to form a luminance histogram like the one shown in FIG. 5. Obviously, the histogram formed in the above highlight/shadow calculation processing (step S132) may be referred to.

In step S172, the average luminance (AVE) of the image is calculated on the basis of the histogram and stored in the parameter holding unit 5. In step S173, the average luminance (NAVE) of the image after correction is calculated on the basis of the average luminance (AVE) of the image and highlight and shadow points (LH and LS) of the image held by the parameter holding unit 5. This average luminance NAVE becomes a target average luminance in exposure compensation in this embodiment.

Figure 13:
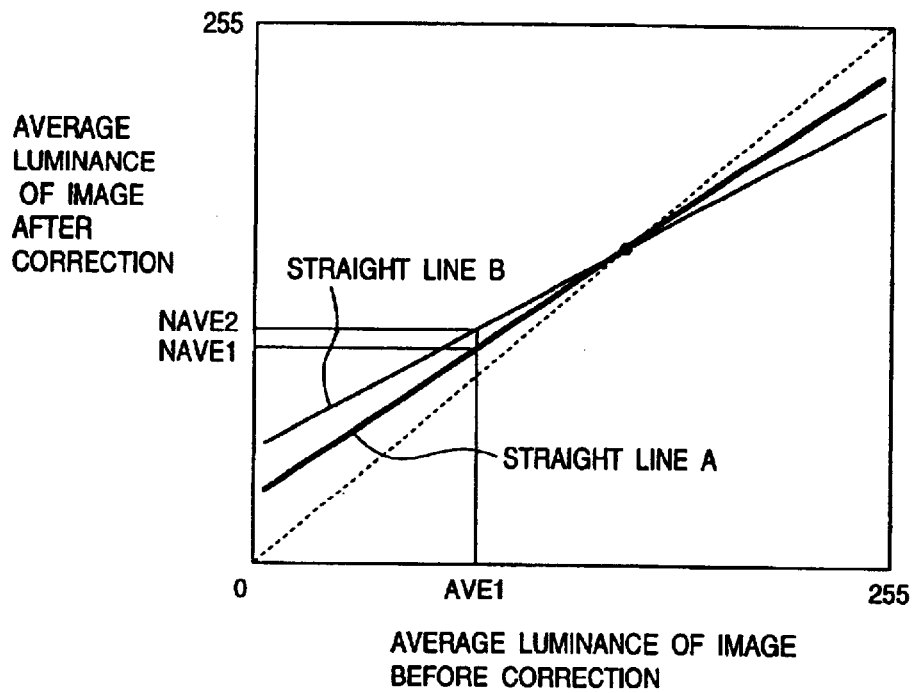
FIG. 13 is a graph showing an example of an exposure compensation amount determination table in the second embodiment.

FIG. 13 shows an example of the data characteristics of the exposure compensation amount determination table 9 which is referred to in the above calculation of NAVE. Referring to FIG. 13, the abscissa indicates the average luminance of the image before correction; and the ordinate, the average luminance after correction. The dotted straight line in FIG. 13 represents the characteristics obtained when no exposure compensation is performed, i.e., the average luminance remains unchanged before and after correction.

As shown in FIG. 13, the exposure compensation amount determination table 9 in this embodiment includes two average luminance conversion straight lines (A and B). The exposure compensation amount varies depending on which line is used. Assume that the straight line A is used. In this case, if the average luminance (AVE) before correction is AVE1, the target average luminance (NAVE) after correction is set to NAVE1. Likewise, when the straight line B is used, the correction target value of AVE1 is set to NAVE2. In the case shown in FIG. 13, the correction amount in exposure compensation using the straight line B becomes larger.

Note that the two straight lines A and B in FIG. 13 may be selectively used in accordance with the highlight and shadow points (LH and LS) of an image. More specifically, if the shadow point (LS) of the image is equal to or less than a given threshold and the highlight point (LH) is equal to or more than another threshold, the original image can be regarded as an image expressing highlights and shadows to a certain degree, and weak exposure compensation is sufficient. In this case, therefore, the straight line A is used. In other cases, e.g., in the events of underexposure and overexposure, since strong exposure compensation is required, the straight line B is used.

Obviously, the conversion straight lines to be referred to in exposure compensation in this embodiment are not limited to the two straight lines described above, and more conversion straight lines can be used. In addition, the conversion characteristics are not limited to those expressed by straight lines, and conversion characteristics expressed by curves may be used. Furthermore, in this embodiment, the conversion straight lines are held as a table, but mathematical expressions representing conversion straight lines or conversion curves may be held.

[Image Correction (Exposure Compensation) Processing]

Figure 14:
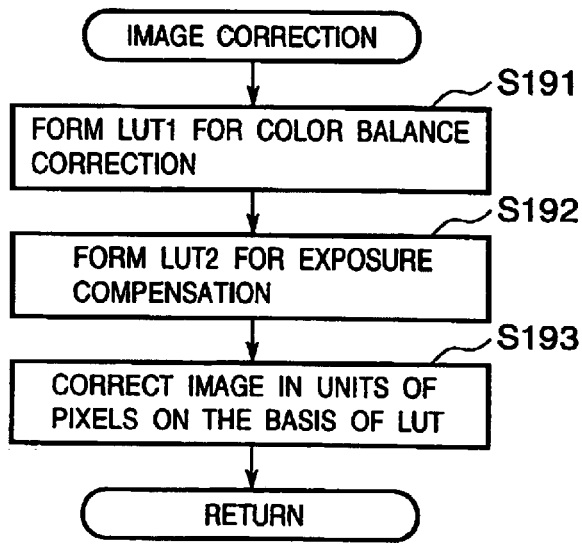
FIG. 14 is a flow chart showing image correction processing in the second embodiment.

FIG. 14 is a flow chart showing image correction processing, i.e., exposure compensation processing, in the image correction unit 10. This flow chart shows the details of step S135 in FIG. 11.

Figure 15:
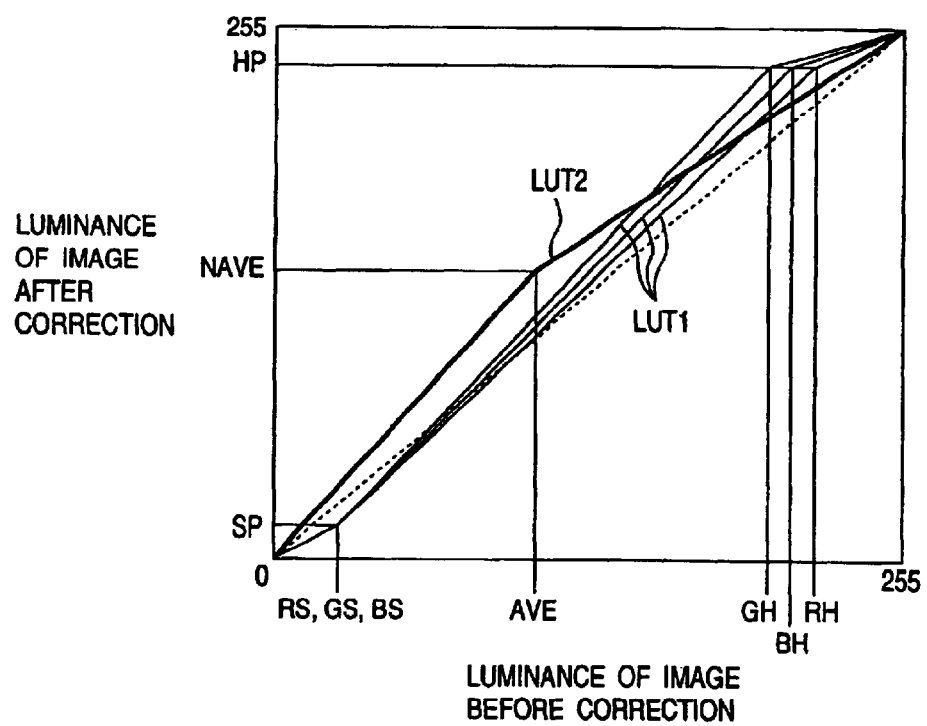
FIG. 15 is a graph showing an example of LUT formed in the second embodiment.

First of all, in step S191, as in the first embodiment, a lookup table (LUT 1) for color balance correction is formed on the basis of white balance data RH, GH, and BH, black balance data RS, GS, and BS, and highlight and shadow points HP and SP after correction, which are held by the parameter holding unit 5. FIG. 15 shows an example of this LUT. Referring to FIG. 15, the dotted straight line represents characteristics obtained when no exposure compensation is performed (the luminance remains unchanged before and after correction).

In step S192, to perform exposure compensation for the entire image, LUT 2 for exposure compensation is formed on the basis of the average luminances (AVE and NAVE) of the image before and after correction, obtained in advance. FIG. 15 shows an example of LUT 2 formed in this case as well. Referring to FIG. 15, LUT 2 is expressed by the two straight lines plotted by connecting the point at which the average luminance (AVE) before correction is converted into the average luminance (NAVE) after correction and the minimum and maximum luminances (0 and 255). Note that LUT 2 is formed for each of the colors, R, G, and B.

In step S193, the image data stored in the image buffer 4 is corrected in units of pixels on the basis of LUT 1 and LUT 2.

As described above, according to the second embodiment, when exposure compensation is to be performed for an image, the highlight and shadow points (LH and LS) of the image before correction are calculated, and the exposure state of the image is determined on the basis of these values. The conversion straight lines (straight lines A and B) to be referred to in exposure compensation are selectively switched on the basis of the determination result, thereby performing correction with a strength corresponding to the exposure state of the image. That is, appropriate exposure compensation can be performed in accordance with the exposure state of the image by determining the exposure compensation amount in consideration of the highlight and shadow points of the image.

Appropriate exposure compensation can therefore be performed for even an image having a special exposure state as in a snow scene, a night scene, or the like.

In this embodiment, the exposure compensation amount is determined on the basis of the average luminances of an image. However, the exposure compensation amount may be determined on the basis of other image feature amounts, e.g., the total luminance of the image.

<Third Embodiment>

The third embodiment of the present invention will be described below. In the third embodiment, an image processing apparatus capable of more appropriate white balance adjustment in addition to the white balance adjustment performed in the first embodiment will be described.

[Arrangement of Processing Unit]

Figure 16:
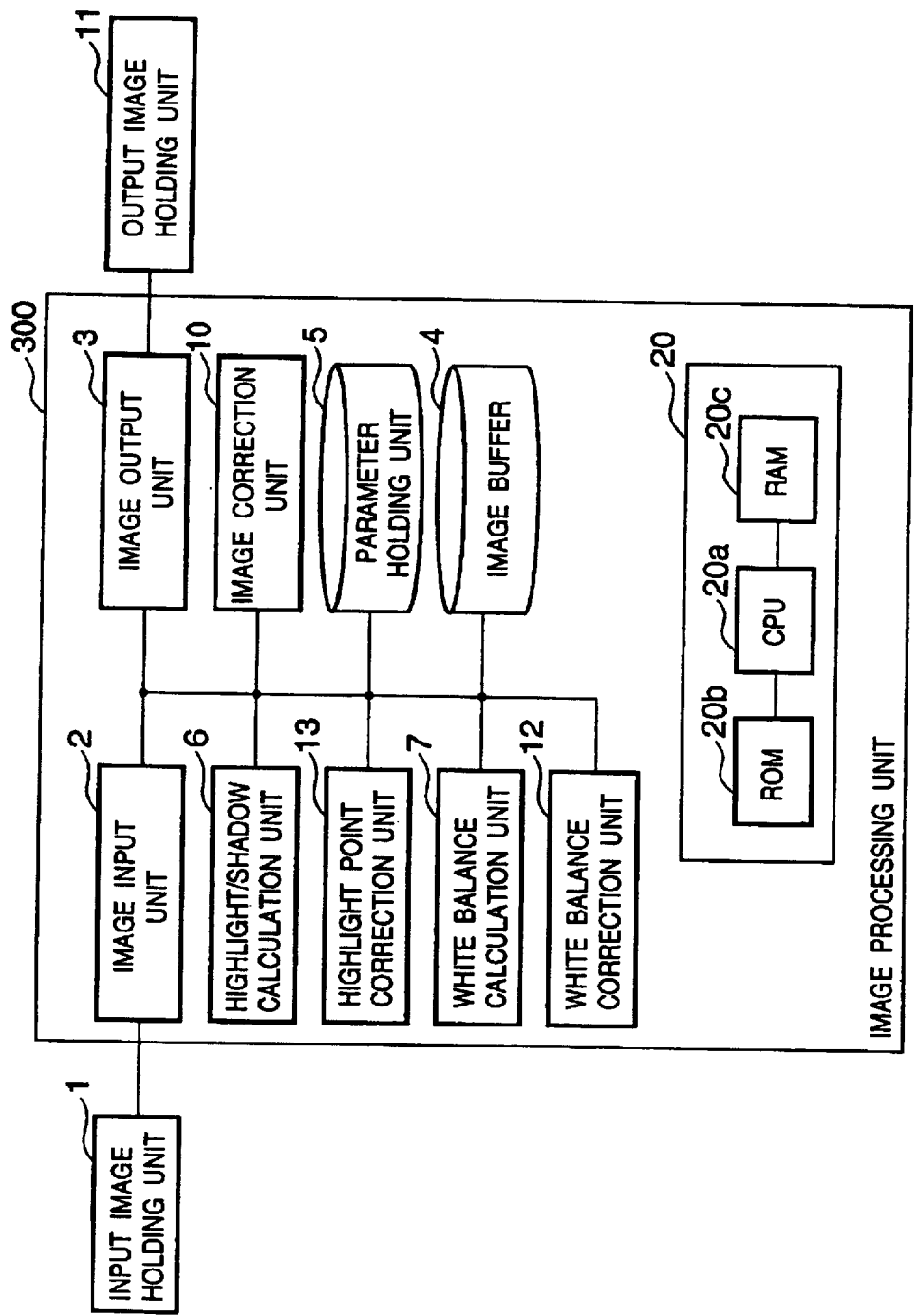
FIG. 16 is a block diagram showing an arrangement for white balance adjustment according to the third embodiment of the present invention.

FIG. 16 is a block diagram showing the arrangement of an image processing unit for performing exposure compensation in the image processing apparatus of the third embodiment. The same reference numerals in an image processing unit 300 in the third embodiment denote the same parts as in the image processing unit 100 in the first embodiment, and a description thereof will be omitted.

Referring to FIG. 16, the image processing unit 300 is characterized by further comprising a white balance correction unit 12 and a highlight point correction unit 13. The white balance correction unit 12 determines the scene presented by an image, and corrects white balance in accordance with the determination result. The white balance correction unit 12 then stores the result in a parameter holding unit 5. The highlight point correction unit 13 corrects the highlight point of the image to ensure gradation characteristics in the highlight area, and stores the result in the parameter holding unit 5.

[White Balance Adjustment Method]

Figure 17:
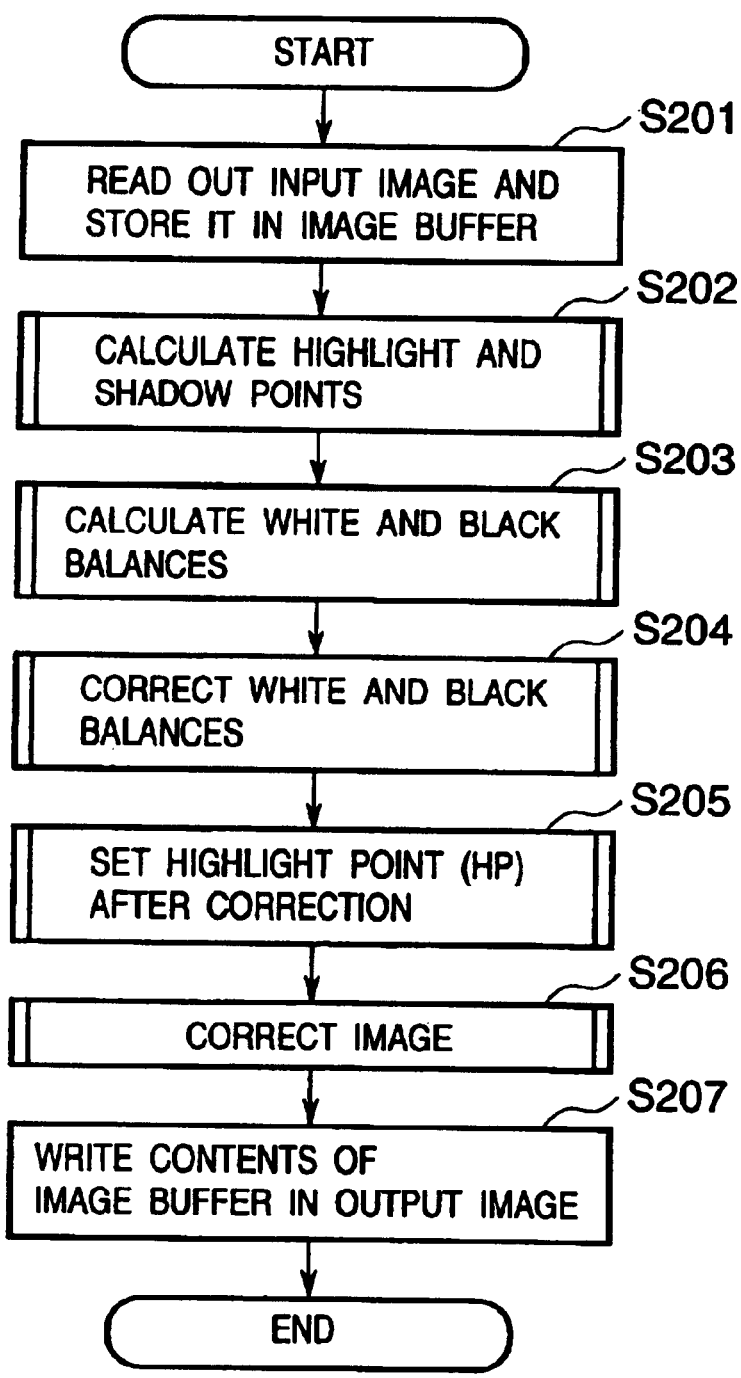
FIG. 17 is a flow chart showing an outline of white balance adjustment processing in the third embodiment.

FIG. 17 is a flow chart showing an outline of a white balance adjustment method according to the third embodiment. First of all, in Step S201, an image input unit 2 reads out image data from an input image holding unit 1 and stores it in an image buffer 4. In Step S202, a highlight/shadow calculation unit 6 calculates the highlight and shadow points of the image data stored in the image buffer 4. The details of this processing are shown in detail in FIG. 18 and will be described later.

In Step S203, a white balance calculation unit 7 calculates the white balance and black balance of the image data stored in the image buffer 4. Since this processing is the same as step S3 in FIG. 3 in the first embodiment, a detailed description thereof will be omitted.

Figure 20:
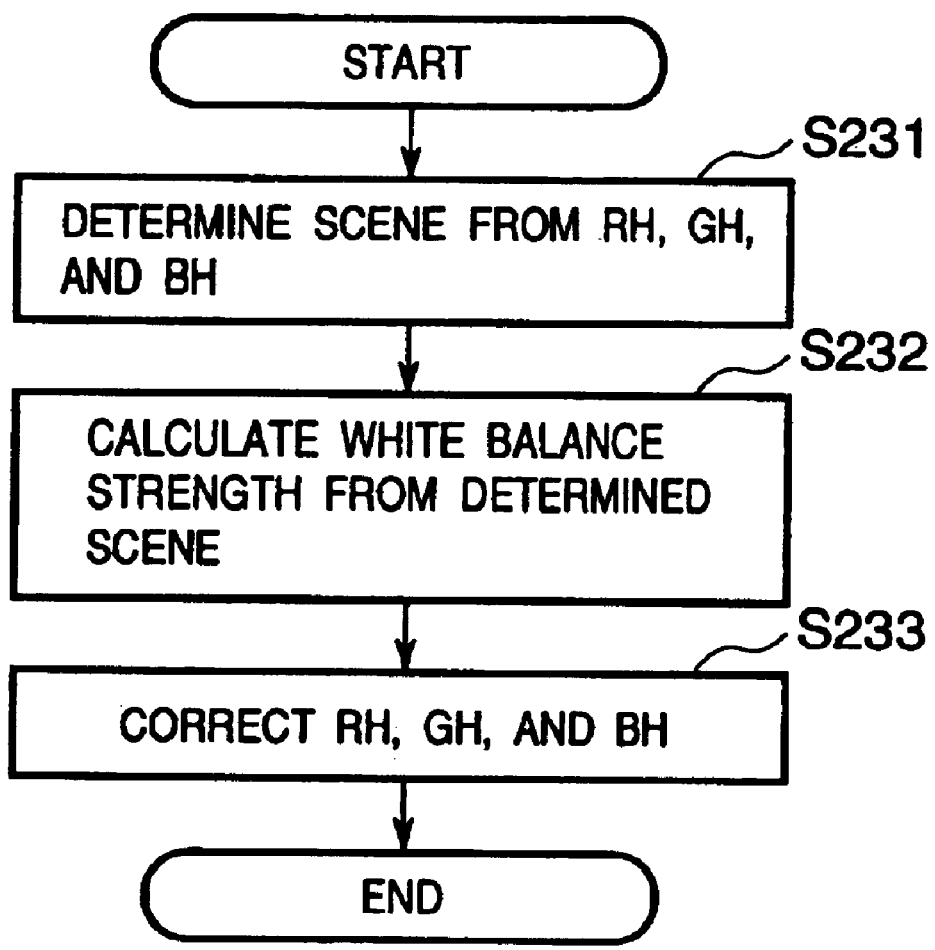
FIG. 20 is a flow chart showing white balance correction processing in the third embodiment.

In Step S204, the white balance correction unit 12 corrects the white balance calculated in Step S203 in accordance with the scene of the image. The details of this processing are shown in FIG. 20 and will be described later.

Figure 24:
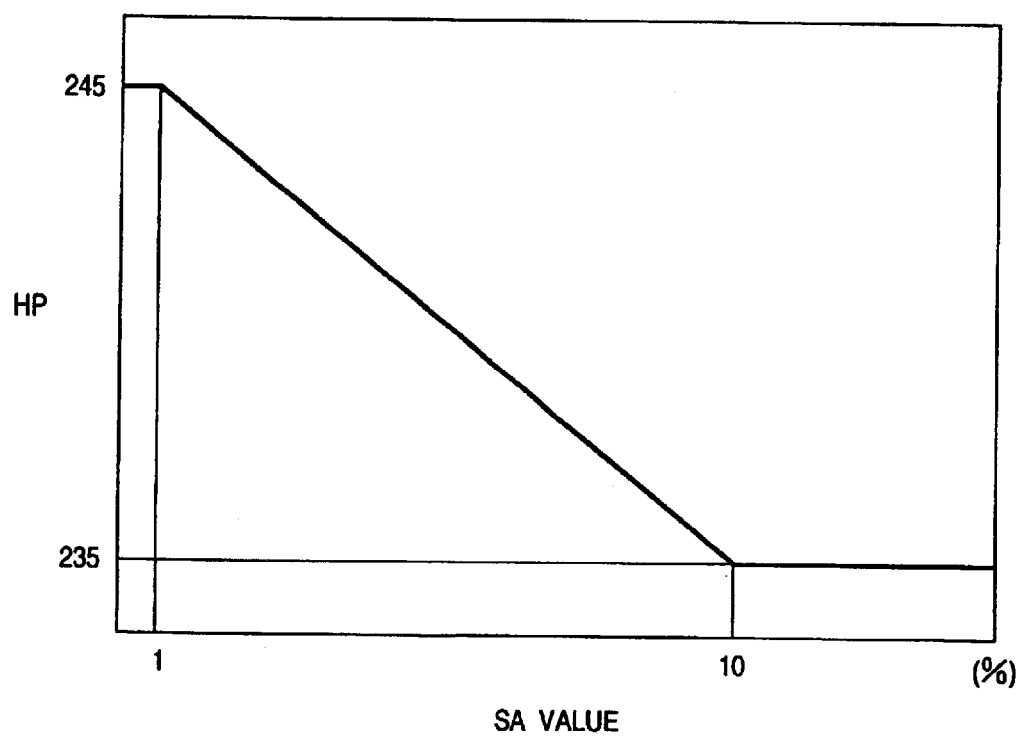
FIG. 24 is a graph showing an example of the relationship between the SA value and HP in the third embodiment.

In Step S205, the highlight point correction unit 13 sets a highlight point (HP) after correction to ensure gradation characteristics in the highlight area. This state is shown in FIG. 24 and will be described later.

In Step S206, an image, correction unit 10 loads image data from the image buffer 4, performs correction for white balance adjustment in units of pixels, and writes the resultant data in the image buffer 4. Since this processing is the same as Step S4 in FIG. 3 in the first embodiment, a detailed description thereof will be omitted. In Step S207, an image output unit 3 outputs the image data, which is held by the image buffer 4, by writing it in an output image holding unit 11.

Note that the parameters held by the parameter holding unit 5 in the second embodiment are the same as those in FIG. 2 in the first embodiment, and are initialized in the same manner.

[Highlight/Shadow Calculation Processing]

Figure 18:
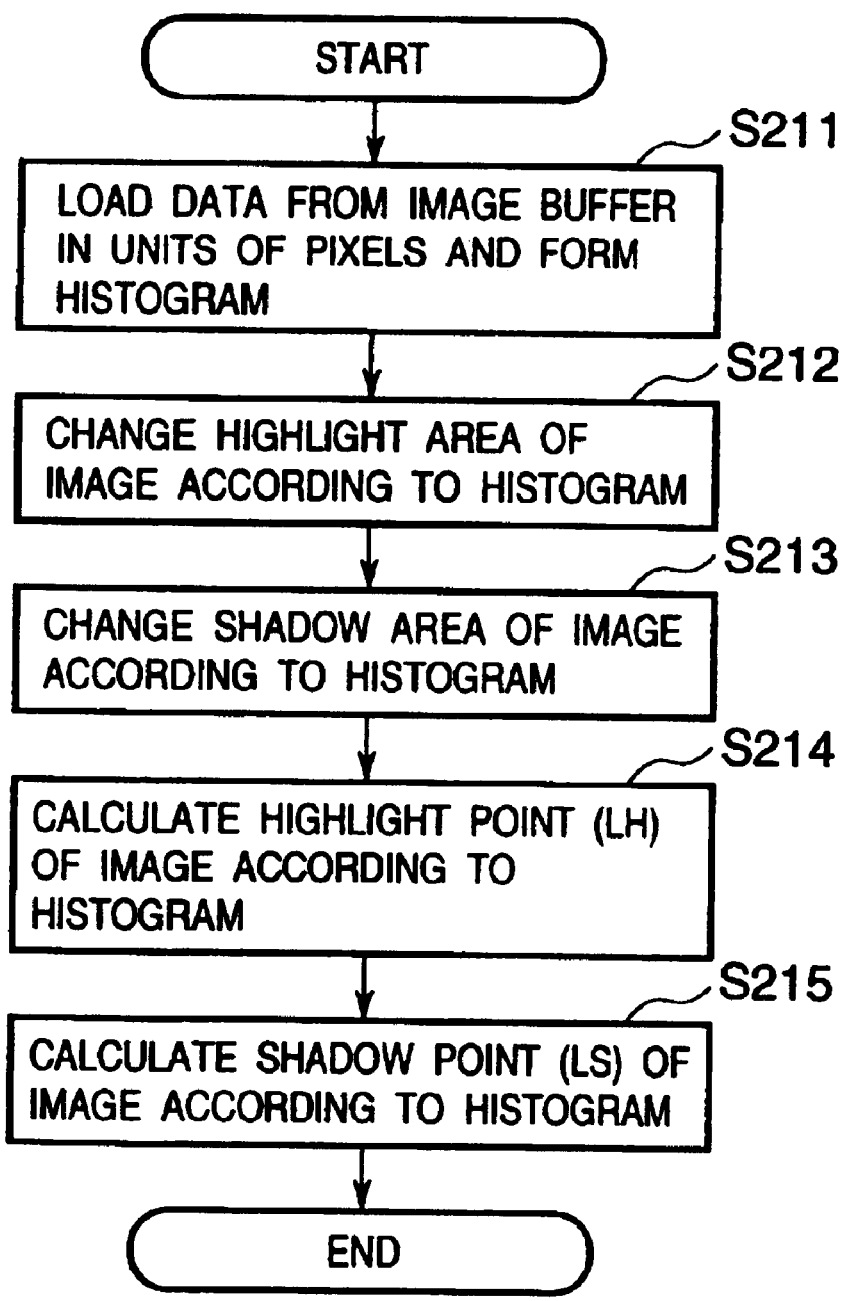
FIG. 18 is a flow chart showing highlight/shadow calculation processing in the third embodiment.

FIG. 18 is a flow chart showing highlight/shadow calculation processing in the highlight/shadow calculation unit 6 in the third embodiment. This flow chart shows Step S202 in FIG. 17 in detail.

Figure 19:
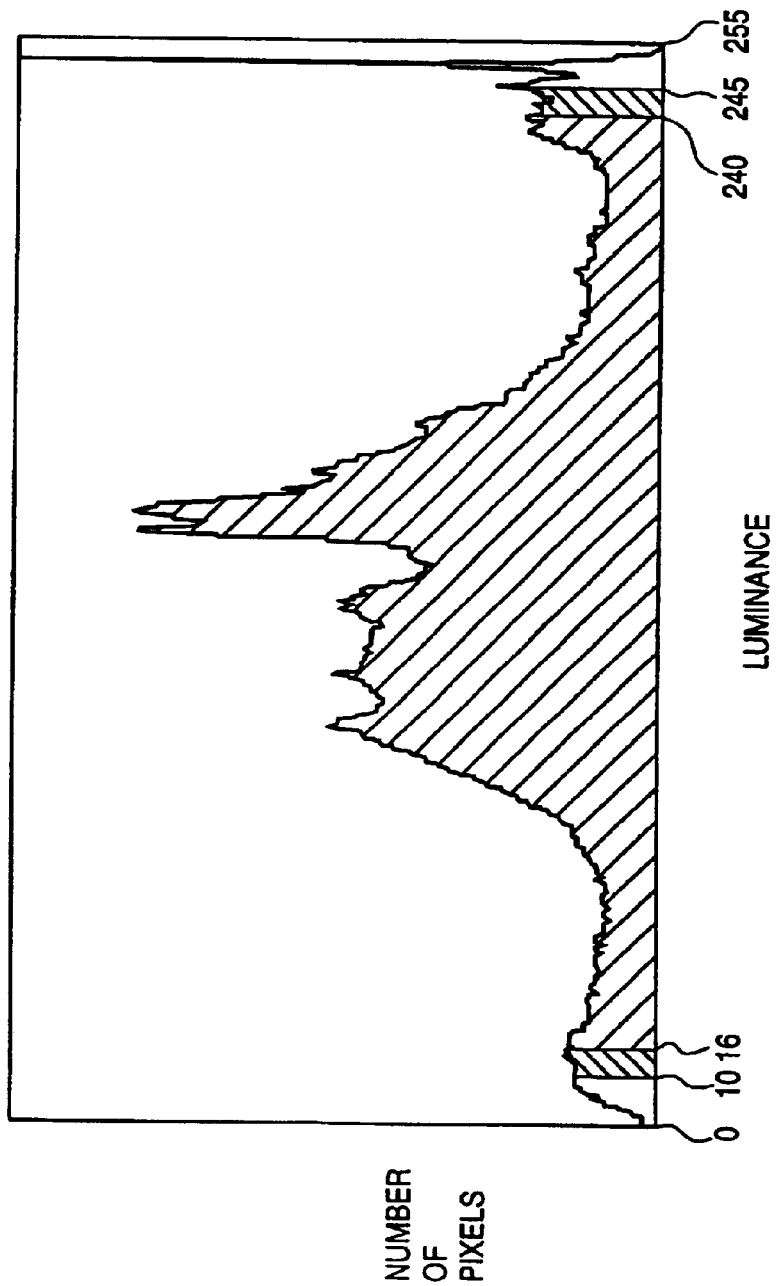
FIG. 19 is a graph showing an example of an image histogram in the third embodiment.

First of all, in Step S211, image data is loaded from the image buffer 4 in units of pixels to form a luminance histogram. FIG. 19 shows an example of this luminance histogram.

In Step S212, the highlight area of the image is obtained on the basis of the formed histogram. More specifically, the percentage of pixels having luminances higher than initialized HP ("245" in this case) to all the pixels is checked, and the obtained value is subtracted from the upper and lower limits of the highlight area. If, for example, the highlight area is 99 to 100%, and the percentage of pixels having luminances higher than HP to all the pixels is 3%, the highlight area is obtained as 96 to 97%. This highlight area "96 to 97%" corresponds to the luminance range of 240 to 245 on the histogram in FIG. 19.

In Step S213, the shadow area of the image is obtained on the basis of the formed histogram. More specifically, the percentage of pixels having luminances lower than initialized SP to all the pixels is checked, and the obtained value is added to the upper and lower limits of the shadow area. If, for example, the shadow area is 0 to 1%, and the percentage of pixels having luminances lower than SP to all the pixels is 5%, the shadow area is obtained as 5 to 6%. This shadow area "5 to 6%" corresponds to the luminance range of 10 to 16 on the histogram in FIG. 19.

In Step S214, the highlight point (LH) of the image is calculated on the basis of the formed histogram. In this case, LH is the minimum luminance in the highlight area. In the histogram shown in FIG. 19, since the luminance range corresponding to the highlight area "96 to 97%" is from 240 to 245, LH is "24". This result is stored in the parameter holding unit 5.

Also, in Step S215, the shadow point (LS) of the image is calculated on the basis of the formed histogram. In this case, LS is the maximum luminance in the shadow area. In the histogram shown in FIG. 19, since the luminance range corresponding to the shadow area "5 to 6%" is from 10 to 16, Ls is "16". This result is stored in the parameter holding unit 5.

In the highlight area calculated in the above manner, white balance is calculated in Step S203 in FIG. 17 by the same method as in the first embodiment. More specifically, the average luminances RH, GH, and BH of R, G, and B pixels in the area in which the luminances range from LH to HP, both inclusive, are calculated. In the histogram shown in FIG. 19, this calculation is performed with respect to the area in which the luminances range from "240" to "245", both inclusive. In the area in which the luminances range between "245" and "255" in FIG. 19, pixels corresponding to 3% of all the pixels are present. This area, however, is ignored when white balance is calculated.

[White Balance Correction Processing]

FIG. 20 is a flow chart showing white balance correction processing in the white balance correction unit 12. This flow chart shows the details of Step S204 in FIG. 17.

In Step S231, the scene presented by an image, i.e., image features, is determined on the basis of RH, GH, and BH stored in the parameter holding unit 5. In the case of the histogram shown in FIG. 19 in the third embodiment, the average luminances of R, G, and B pixels in the area in which the luminances range from LH to HP, both inclusive, i.e., the area in which the luminances range from "240" to "245", both inclusive, are stored as RH, GH, and BH in the parameter holding unit 5 by the white balance calculation processing in Step S203.

Figure 21:
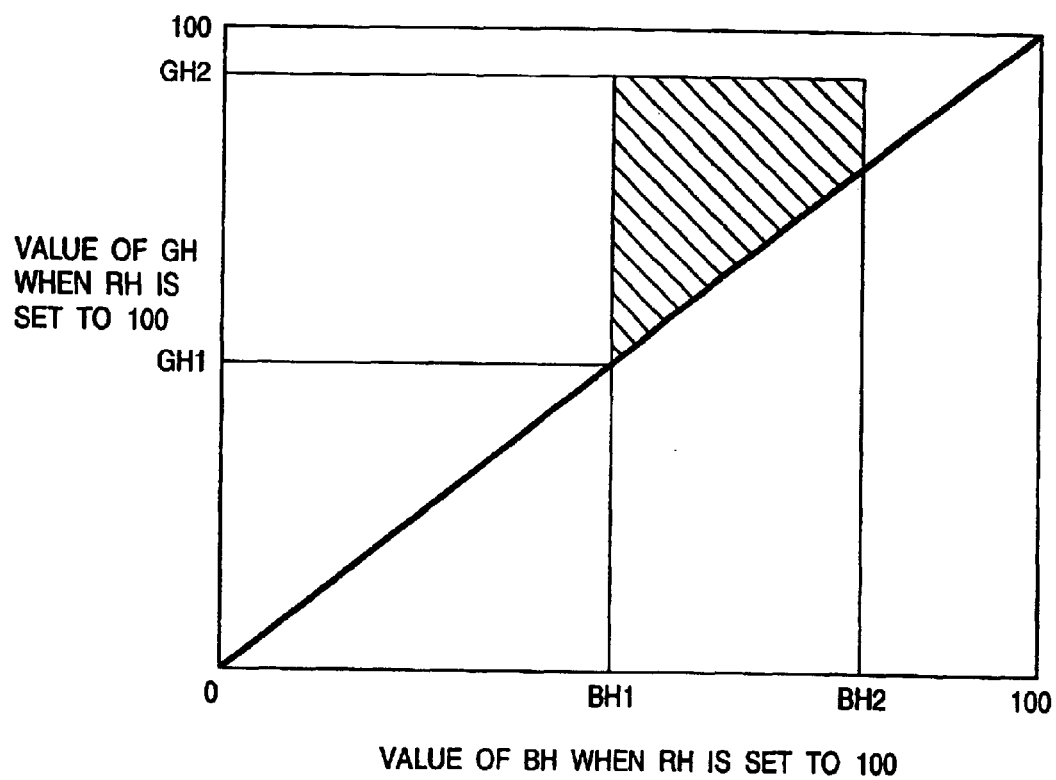
FIG. 21 is a graph showing examples of scene determination criteria in the third embodiment.

According to the scene determination method in the third embodiment, a scene is basically determined in accordance with the decreasing order of the luminances of R, G, and B and the ratio of a color having a maximum luminance to the remaining colors. FIG. 21 shows an example of scene determination criteria. In this case, a scene is determined on the basis of the values of BH and GH (0 to 100) and the relationship in magnitude between GH and BH with RH of the image being set to "100". For example, the dotted area in FIG. 21 (the area defined as BH1<BH<BH2 and GH1<GH<GH2) corresponds to a sunset scene. In addition, various scenes can be determined by considering the values of RH and GH (0 to 100) with BH being set to "100" and the values of GH and BH (0 to 100) with BH being set to "100".

Figure 22A:
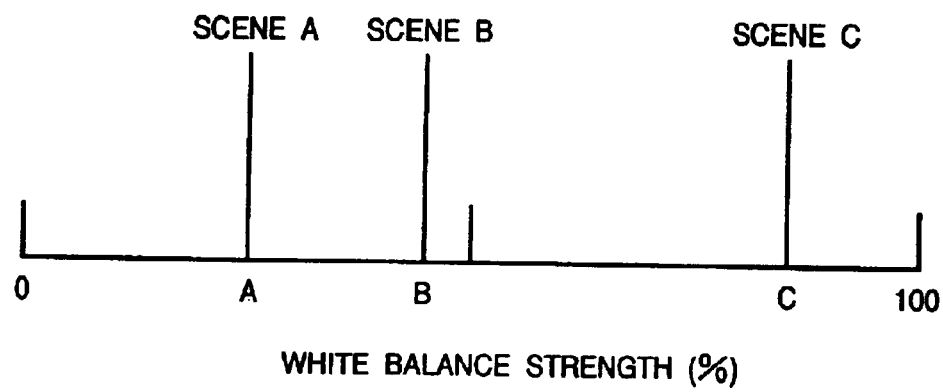
FIGS. 22A and 22B are graphs showing the relationships between scenes and white balance strengths in the third embodiment.
Figure 22B:
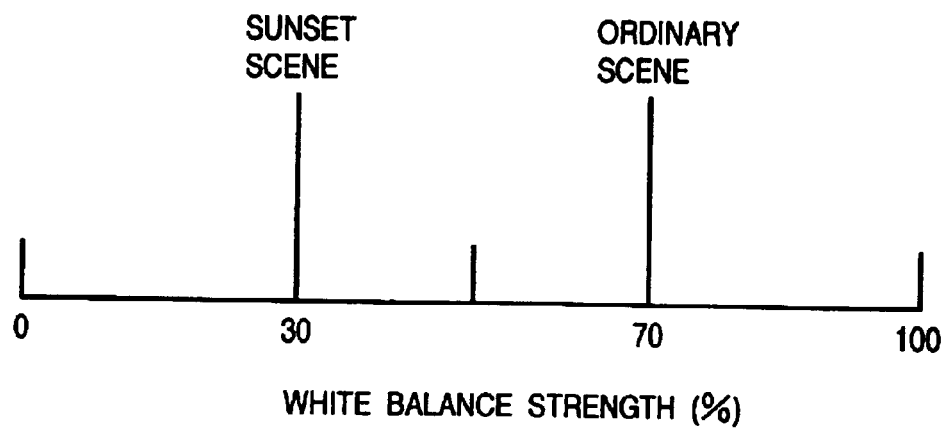

In Step S232, the white balance strength is calculated on the basis of the scene determined in Step S231. FIGS. 22A and 22B show the relationships between the scenes and the white balance strengths. Referring to FIGS. 22A and 22B, when white balance is completely achieved, the white balance strength is defined as 100%, whereas when no white balance is achieved, the white balance strength is defined as 0%. As shown in FIG. 22A, the manner of achieving white balance is changed by properly setting white balance strengths (%) in accordance with scenes. In the case shown in FIG. 22B, the white balance strength corresponding to an "ordinary" scene is set to 70% to prevent the image from becoming completely white. In contrast to this, a white balance strength of 30% is set for a "sunset" scene. That is, weaker white balance is achieved in this scene than in an "ordinary" scene. Note that white balance strengths are preferably set in the third embodiment such that the formed image suffers no damage even at the occurrence of a scene determination error.

Figure 23A:
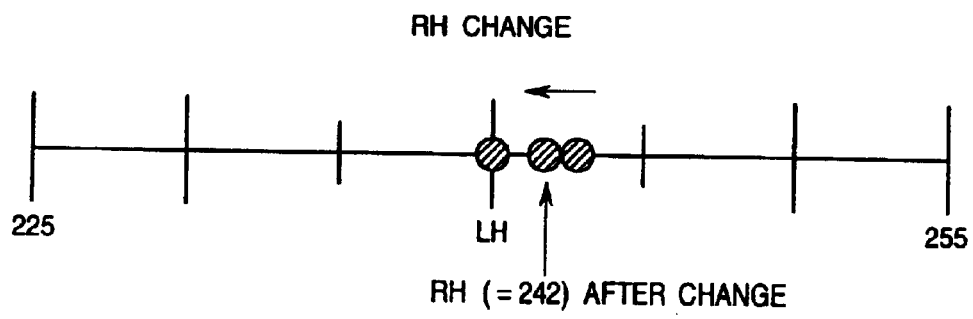
FIGS. 23A to 23C are graphs showing examples of how RH, GH, and BH are changed in the third embodiment.
Figure 23B:
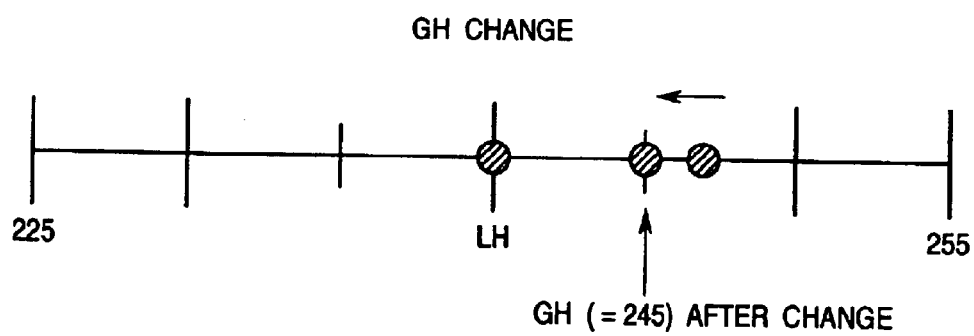
Figure 23C:
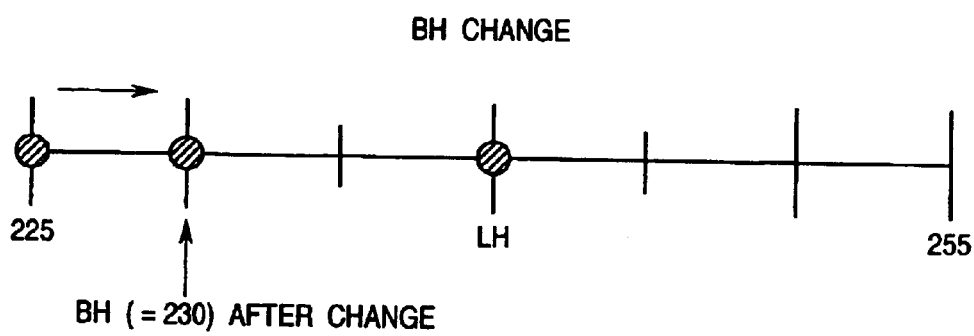

In Step S233, the values of RH, GH, and BH are corrected on the basis of the calculated white balance strength, and the resultant data are stored in the parameter holding unit 5. FIGS. 23A to 23C show a practical example of how RH, GH, and BH are changed. This operation will be described below. In the third embodiment, basically, RH, GH, and BH are changed to be set at points at which the intervals between LH and RH, GH, and BH are internally divided in accordance with the white balance strengths. In the case shown in FIGS. 23A to 23C, if LH=240, RH=243, GH=247, BH=255, and white balance strength=70%, RH corresponds to the point at which the interval from "243" to "240" is internally divided at 3:7, as shown in FIG. 23A. Therefore, RH is changed to 242 (rounded). Similarly, referring to FIGS. 23B and 23C, GH and BH are respectively changed to 245 and 230.

Although not specifically described in the third embodiment, black balance correction can be performed in accordance with various scenes on the basis of a similar principle.

[Highlight Point Correction Processing]

Highlight point correction processing in the highlight point correction unit 13 will be described below with reference to FIG. 24. FIG. 24 shows the details of Step S205 in FIG. 17.

FIG. 24 is a graph showing the relationship between HP and the percentage (%: Saturated Area to be referred to as an SA value hereinafter) of the number of pixels having luminances higher than those of the highlight area. In the third embodiment, as the number of pixels having luminances higher than those of the highlight area increases, i.e., the SA value increases, HP is decreased. Referring to FIG. 24, when the SA value is 0%, HP is "245". HP is gradually decreased until the SA value becomes 10%. If the SA value is 10% or more, HP is always "235". That is, HP in the third embodiment does not become less than "235". By setting the lower limit of HP in this manner, the gradation characteristics in the highlight area can be ensured. In the image having the histogram shown in FIG. 19, since 3% of all the pixels are present in the area corresponding to the luminance range (SA) higher in luminance than the highlight area, HP is set to "241" by rounding down HP=241.66 . . . , i.e., dropping all digits after the decimal point, according to the graph of FIG. 24.

An appropriate correction LUT is formed in Step S206 in FIG. 17 by setting the highlight point HP after correction in the above manner, and the luminances of the respective colors are properly corrected in accordance with a scene, thereby allowing white balance adjustment in accordance with each scene.

As has been described above, according to the third embodiment, white balance can always be achieved, even if all the luminances of the pixels in a high-luminance area are equal to or higher than a predetermined value, by changing the highlight area and the highlight point (HP) after correction in accordance with the number of pixels having luminances equal to or higher than the predetermined value. In addition, gradation characteristics in the highlight area can be ensured.

Furthermore, white balance adjustment can be properly performed in accordance with a scene by adjusting the white balance strength in accordance with the scene.

The third embodiment is characterized by adding parameter correction processing performed by the white balance correction unit 12 and the highlight point correction unit 13 in addition to the white balance adjustment described in the first embodiment. In the present invention, however, only one of correction performed by the white balance correction unit 12 and correction performed by the highlight point correction unit 13 may be added to the white balance adjustment in the first embodiment.

In the third embodiment, for example, white balance adjustment is performed for a "sunset" scene. However, there are many other images for which proper white balance adjustment according to the second embodiment can be effectively performed. For example, in a "flashlight photography" image formed by taking a picture upon turning on the flash device, highlights on high skink portions of the person are saturated. As a result, gradation information is lost, i.e., highlights are bleached out. For such an image, image correction must be performed in the direction to suppress bleaching out of highlights. When white balance adjustment according to the third embodiment is performed for such an image having bleached highlights, effective correction that suppresses bleaching out of highlights can be performed by changing the highlight point after correction in accordance with the percentage of an area having bleached highlights. In this manner, the third embodiment can ensure good gradation in a highlight area in flash photography.

As described above, according to the present invention, a highlight point can be properly set, and exposure compensation and white balance adjustment can be performed in accordance with the features of images. Therefore, appropriate correction can be performed for any type of image.

In the first to third embodiments described above, image features are analyzed on the basis of all the pixels constituting a correction target image, and appropriate correction is performed on the basis of the analysis result. However, the correction processing in the present invention can be executed for only a specific area extracted from an image and having predetermined features.

[Other Embodiments]

Note that the present invention may be applied to either a system constituted by a plurality of devices (e.g., a host computer, an interface device, a reader, a printer, and the like), or an apparatus consisting of a single device (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the above storage medium, program codes corresponding to the flow charts described above (FIGS. 3, 4, 6, 7, 11, 12, 14, 17, 18, and 20) are stored in the storage medium.

As has been described above, according to the present invention, white balance adjustment and exposure compensation can be performed in accordance with the features of an image by considering the arrangement of the pixel values in the highlight and shadow areas of the image. Appropriate correction processing can therefore be performed for any type of image.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    holding means for holding a plurality of conversion characteristics;
    calculation means for calculating an average luminance of an input image;
    obtaining means for obtaining a target luminance according to the average luminance by using one of the plurality of conversion characteristics, the one of the conversion characteristics being selected on the basis of the highlight and shadow points;
    setting means for setting an exposure compensation condition on the basis of the target luminance; and
    correction means for correcting the input image on the basis of the exposure compensation condition.

2. The apparatus according to claim 1, wherein said calculation means selects a weak conversion characteristic when the highlight point is not less than a first threshold and the shadow point is not more than a second threshold, and selects a strong conversion characteristic in other cases.

3. The apparatus according to claim 2, wherein the first threshold is larger than the second threshold.

4. An image processing apparatus comprising:
    first calculation means for calculating white balance of an input image on the basis of pixels having luminances less than a predetermined luminance in the highlight area of the input image;
    first setting means for setting a gradation correction condition on the basis of the white balance and the predetermined luminance;
    extraction means for extracting highlight and shadow points on the basis of a color distribution of an input image;
    second calculation means for calculating an average luminance of the input image and calculating a target luminance on the basis of the average luminance and the highlight and shadow points; and
    second setting means for setting an exposure compensation condition on the basis of the target luminance,
    wherein the apparatus corrects the input image on the basis of the gradation correction condition and the exposure compensation condition.

5. The apparatus according to claim 4, further comprising correction means for correcting the input image on the basis of the exposure compensation condition set by said setting means.

6. The apparatus according to claim 4, further comprising holding means for holding a conversion characteristic to be referred to when a target luminance is calculated by said calculation means.

7. An image processing method comprising the steps of:
    holding a plurality of conversion characteristics;
    calculating an average luminance of an input image;
    obtaining means for obtaining a target luminance according to the average luminance by using one of the plurality of conversion characteristics, the one of the conversion characteristics being selected on the basis of the highlight and shadow points;
    setting an exposure compensation condition on the basis of the target luminance;
    correcting the input image on the basis of the exposure compensation condition.

8. The method according to claim 7, wherein said calculation step includes selecting a weak conversion characteristic when the highlight point is not less than a first threshold and the shadow point is not more than a second threshold, and selecting a strong conversion characteristic in other cases.

9. The method according to claim 8, wherein the first threshold is larger than the second threshold.

10. A recording medium on which a program code for image correction processing is recorded, the program code comprising at least:
    code for holding a plurality of conversion characteristics;
    code for calculating an average luminance of an input image;
    code for obtaining means for obtaining a target luminance according to the average luminance by using one of the plurality of conversion characteristics, the one of the conversion characteristics being selected on the basis of the highlight and shadow points;

code for setting an exposure compensation condition on the basis of the target luminance; and code for correcting the input image on the basis of the exposure compensation condition.

11. An image processing method comprising the steps of:

calculating white balance of an input image on the basis of pixels having luminances less than a predetermined luminance in the highlight area of the input image;

setting a gradation correction condition on the basis of the white balance and the predetermined luminance;

extracting highlight and shadow points on the basis of a color distribution of an input image;

calculating an average luminance of the input image and calculating a target luminance on the basis of the average luminance and the highlight and shadow points; and setting an exposure compensation condition on the basis of the target luminance, wherein the input image is corrected on the basis of the gradation correction condition and the exposure compensation condition.

12. A recording medium on which a program code for image correction processing is recorded, the program code comprising at least:

code for calculating white balance of an input image on the basis of pixels having luminances less than a predetermined luminance in the highlight area of the input image;

code for setting a gradation correction condition on the basis of the white balance and the predetermined luminance;

code for extracting highlight and shadow points on the basis of a color distribution of an input image;

code for calculating an average luminance of the input image and calculating a target luminance on the basis of the average luminance and the highlight and shadow points; and code for setting an exposure compensation condition on the basis of the target luminance, wherein the input image is corrected on the basis of the gradation correction condition and the exposure compensation condition.

* * * * *